Sept. 12, 1933.  S. H. FRYE ET AL  1,926,741
OIL PURIFYING APPARATUS
Filed May 7, 1932   2 Sheets-Sheet 1
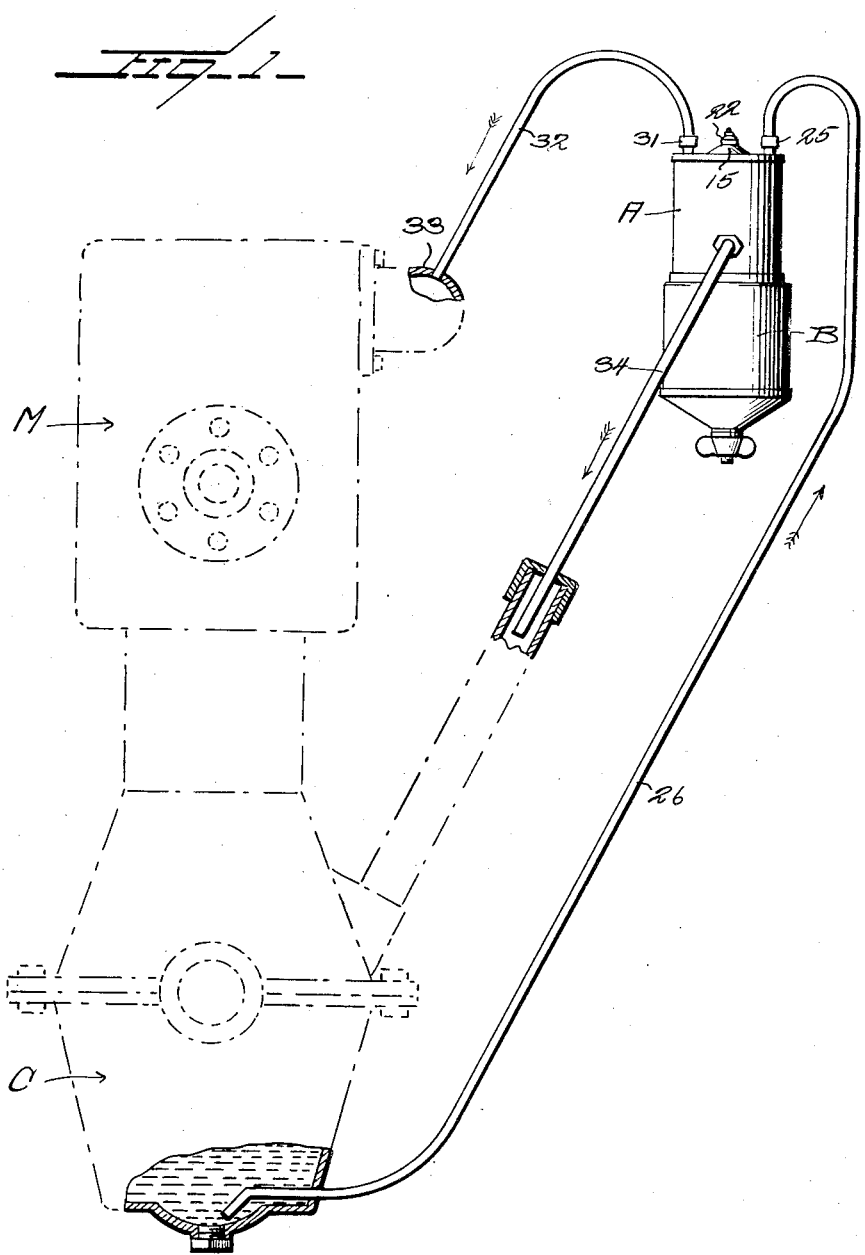

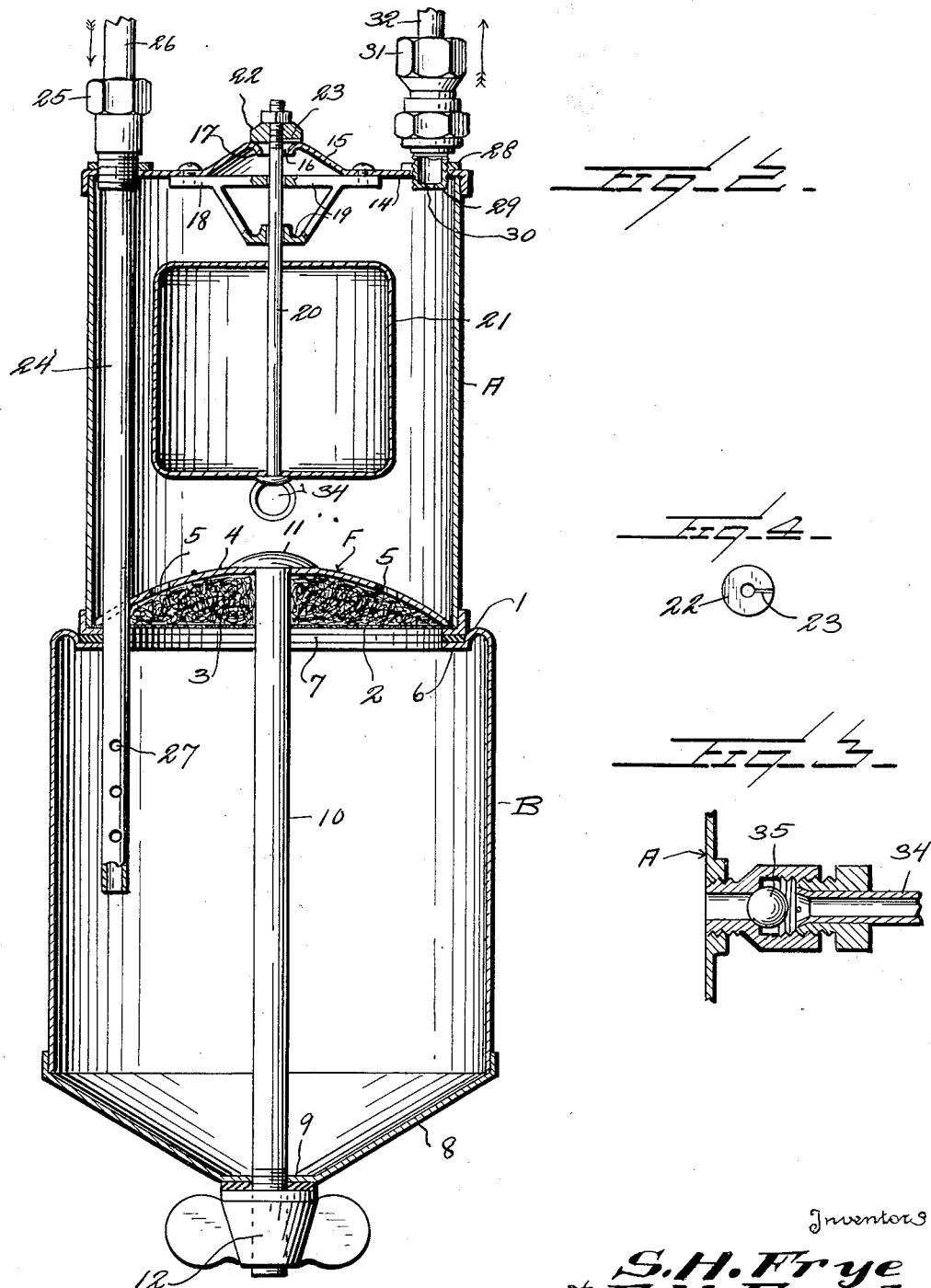

Patented Sept. 12, 1933

1,926,741

UNITED STATES PATENT OFFICE 1,926,741

OIL PURIFYING APPARATUS

Samuel H. Frye and Frank H. Ford, Findlay, Ohio

Application May 7, 1932. Serial No. 609,956

6 Claims. (Cl. 184—6)

This invention relates to an oil purifying apparatus and has relation more particularly to an apparatus of this kind especially designed and adapted for use with an internal combustion engine of the general type employed in connection with motor vehicles.

It is an object of the invention to provide an apparatus of this kind whereby, when the motor is running, the oil within the crank case is placed in intermittent circulation as a result of suction incident to the pulsations of the motor and wherein said oil in circulation is caused to pass through a filtering medium to free the same of such impurities as may be therein, such as carbon and other foreign matter.

Another object of the invention is to provide an apparatus of this kind comprising two chambers, flow from one chamber to the other being through a filtering medium, one of said chambers being in communication with the manifold of an internal combustion engine or the like and also having a return line leading therefrom to the crank case of the motor and wherein the second chamber has discharging therein a line leading from the low portion of the crank case, the first named chamber being provided with means for breaking suction action upon the oil when the oil within said chamber reaches a predetermined level.

It is also an object of the invention to provide an apparatus of this kind embodying a filtering unit through which oil within a crank case is adapted to be drawn as a result of suction created by pulsations of the motor, together with means for siphoning the oil back to the crank case when the motor is at rest, said siphoning action resulting in a reverse flow of the oil through the filtering unit to release impurities held thereby.

The invention consists in the details of construction and in the combination and arrangement of the several parts of our improved oil purifying apparatus whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a view partly in section and partly in elevation and of a diagrammatic character and with a portion in broken lines illustrating an oil purifying apparatus constructed in accordance with an embodiment of our invention;

Figure 2 is an enlarged view partly in vertical section and partly in side elevation taken through the apparatus as herein disclosed;

Figure 3 is a fragmentary sectional view illustrating in detail the check valve interposed in the oil return line;

Figure 4 is a view in bottom plan of the valve member for closing the air port.

As herein disclosed, our improved apparatus comprises two containers A and B mounted one upon the other to provide upper and lower chambers, said chambers being separated by a filtering unit F herein disclosed as carried within the upper container A at the lower part thereof.

The lower end of the container A is defined by an inwardly disposed flange 1 with which engages the marginal portion of a screening element 2 of relatively fine mesh, and superimposed upon this screening element 2 is a mass 3 of chemically treated wool fibre or other suitable material and which mass 3 has an affinity for carbon. This mass 3 is maintained in desired placement over the screening element 2 by a retaining plate 4 concavo convex in form with its concave face downwardly disposed and said plate 4 having its marginal edge in contact with the marginal portion of the screening element 2 above the inwardly directed flange 1. This plate 4 is provided with a series of relatively large openings 5 through which oil may readily pass.

Aside from the flange 1 and the applied filtering unit F the lower end of the container A is open.

The upper end of the container B is also open but said open end is provided therearound with an inwardly directed flange 6 upon which is rested the container A, said flange 6 of the container B and the flange 1 of the container A having interposed therebetween a gasket 7 to assure an airtight joint between said applied containers A and B.

The lower end of the container B is also open but is normally closed by a slip cap 8 in the form of an inverted cone with its apex portion flattened, as at 9. Extending axially of the container B and through the applied plate 4 and the flattened portion 9 of the cap 8 is a holding bolt 10. This bolt 10 at one end is provided with a head 11 contacting from above with the plate 4 and threaded upon the opposite end portion of the bolt 10 is a nut 12, herein disclosed of a wing type, contacting from without with the flattened portion 9 of the applied cap 8. This bolt 10 through the instrumentality of its head 11 and the nut 12 operates to effectively maintain the containers A and B in desired assembly together with the filtering unit F.

The upper or top end of the container A is closed by a head 14, the central portion of which being provided with a relatively broad upstanding and substantially conical protuberance 15, the apex portion of which being open, as at 16, said open portion being defined by an inwardly and downwardly curved wall 17 for a purpose to be hereinafter referred to. Secured to the inner face of the head 14 and extending radially across the protuberance 15 is a stirrup 18 embodying the spaced parallel members 19 through which are slidably engaged an elongated stem 20. The upper portion of this stem 20 is directed through the opening 16 in the protuberance 15 while the lower or inserted end portion of the stem carries a float 21.

The stem 20 above the head 14, and more particularly the protuberance 15 thereof, has secured thereto a valve member 22 which normally contacts with the central portion of the protuberance 15 to substantially close the opening 16 from the atmosphere. The under or working face of this valve member 22, as herein disclosed, is flat and said flat face is provided with a radial groove 23 open to the atmosphere at all times whereby is permitted a constant communication of the interior of the container A with the atmosphere, such communication however being restricted when the valve member 22 is seated.

Extending through the container A is a pipe 24, said pipe being of a length to extend a material distance downwardly within the container B. The upper portion of the pipe 24 is suitably coupled, as at 25, to a line 26 leading from the low point of the crank case C of the motor as diagrammatically illustrated in Figure 1 of the accompanying drawings. The portion of the pipe 24 within the container B has its wall provided therealong with a series of spaced openings 27 affording communication between the interior of the container B and the bore of the pipe 24. It is also to be noted, as clearly illustrated in Figure 2, that the lower or discharge end of the bore of the pipe 24 is fully open.

Also disposed through the head 14 of the container A is a nipple 28, the inserted end of which being substantially closed by the head 29, said head however having therethrough a restricted opening 30 the area of which being considerably in excess of the cross sectional area of the groove 23 hereinbefore referred to in the valve member 22.

The outer portion of the nipple 28 is coupled, as at 31, with a line 32 leading to and communicating with the intake manifold of the motor M so that when the motor is in operation the suction created by the pulsations of such motor will create a vacuum within the containers A and B with a resultant suction through the pipe 24 and line 26 to draw the oil from the crank case C into the container B.

As the oil fills the container B it will pass up through the filtering unit F into the container A. The screening element 2 during this flow of the oil from the lower container B to the upper container A will separate from the oil such foreign matter as road dust and the like while the oil as it continues through the unit F will be freed of any carbon therein by the mass 3 which, as hereinbefore stated, is chemically treated to have an affinity for carbon. Therefore, when the oil enters the upper chamber B it is substantially free of impurities without injury to or breaking down of the recovered oil.

When the oil within the upper container B reaches a predetermined level the float 21 will rise sufficiently to unseat the valve member 22, thus opening the container A to the atmosphere through the opening 16 and thereby break the suction action through the pipe 24 and its associated line 26. When this suction is broken a considerable portion of the recovered oil within the container A will be returned to the crank case C through the return line 34 leading from the container A at a point above but in relatively close proximity to the applied filtering unit F.

This return line 34 has interposed therein, as illustrated in Figure 3, a check valve 35 which, when the valve member 22 is closed and effective suction is being created within the containers A and B, is maintained closed by such suction and thereby during that time prevent flow of oil through the return line 34. When the valve member 22 is unseated and the suction action broken this valve 35 will also open thus allowing the oil within the container A to return to the crank case C through the line 34.

In practice our improved apparatus is adapted to be preferably supported by the dash under the hood and at a point above the crank case whereby the flow through the return pipe line 34 is facilitated and also to assure, when the valve member 22 is open, a siphon action to return the oil within the container A below the point of communication between said container A and the pipe line 34 and the oil in the upper portion of the container B. As the oil is returned by this siphoning action such oil which has return flow through the filtering unit F will free the screening element 2 of such particles which may have accumulated thereon so that such particles may be precipitated to the bottom of the container B.

It is also to be noted that the uppermost opening 27 is below the top of the member B so that siphoning action just mentioned will assure the return of the oil within the upper portion of the container B above said uppermost opening 27 so that when the lower container B is removed for cleansing it will be assured that the level within the container B will be such to substantially eliminate liability of overflow.

The channel 23 provided along the under or flat face of the valve member 22 provides sufficient communication with the atmosphere to eliminate at any time the drawing of oil through the line 32 into the intake manifold and especially under such conditions when the float 21 fails to raise the valve member 22.

The opening 16 is provided in the upper or high portion of the conical protuberance 15 so that the liability of foreign matter collecting on such protuberance entering the container A through the opening 16 is substantially eliminated and the curved wall 17 defining the opening 16 is provided to facilitate the freeing of any particles which may settle around the opening 16 when the valve member 22 is opened and which would otherwise have a tendency to interfere with the proper seating of the valve member 22.

It is also to be stated that while the oil is within the lower container B foreign matter, such as road dust or the like, will settle and it is to be further stated that when the motor comes to rest the suction action will also stop and the same operations will occur as have hereinbefore been described as resulting when the valve member 22 is unseated.

Our improved apparatus has the further advantage of assuring the oil as it returns to the crank case being in the most effective condition in view of the fact that the oil is maintained in the apparatus a time sufficient to allow the same to cool off. It is to be stated that the apparatus also serves to free the oil of any metal particles that may be carried out by the crank case and which particles may be the result of wear or grindings.

From the foregoing description it is thought to be obvious that an oil purifying apparatus constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. An oil purifying apparatus for use in connection with an internal combustion engine having an intake manifold and a crank case, said apparatus having upper and lower chambers, a filtering unit separating said chambers, a pipe line discharging in one of the chambers and adapted to have communication with the crank case, a line in communication with the second chamber and adapted for connection with the intake manifold so that pulsations of the motor will create a suction through the chambers and through the first named line to draw oil from the crank case into the first named chamber and through the filtering unit into the second chamber, said second chamber having an opening in communication with the atmosphere, a valve normally closing said opening, a float operatively connected with the valve for unseating the valve when the oil level within the second chamber reaches a predetermined level, a return line leading from the second chamber to the crank case, and a check valve within said last named line, said check valve being maintained in closed position by the suction created within the chambers.

2. An oil purifying apparatus for use in connection with an internal combustion engine having an intake manifold and a crank case, said apparatus having upper and lower chambers, a filtering unit separating said chambers, a pipe line discharging in one of the chambers and adapted to have communication with the crank case, a line in communication with the second chamber and adapted for connection with the intake manifold so that pulsations of the motor will create a suction through the chambers and through the first named line to draw oil from the crank case into the first named chamber and through the filtering unit into the second chamber, said second chamber having an opening in communication with the atmosphere, a valve normally closing said opening, a float operatively connected with the valve for unseating the valve when the oil within the second chamber reaches a predetermined level, a return line leading from the second chamber to the crank case, and a check valve within said last named line, said check valve being maintained in closed position by the suction created within the chambers, said first named valve having a channel to afford communication with the opening and the atmosphere when the first named valve is seated.

3. An oil purifying apparatus for use in connection with an internal combustion engine having an intake manifold and a crank case, said apparatus having upper and lower chambers, a filtering unit separating said chambers, a pipe line discharging in one of the chambers and adapted to have communication with the crank case, a line in communication with the second chamber and adapted for connection with the intake manifold so that pulsations of the motor will create a suction through the chambers and through the first named line to draw oil from the crank case into the first named chamber and through the filtering unit into the second chamber, said second chamber having an opening in communication with the atmosphere, a valve normally closing said opening, a float operatively connected with the valve for unseating the valve when the oil within the second chamber reaches a predetermined level, a return line leading from the second chamber to the crank case, and a check valve within said last named line, said check valve being maintained in closed position by the suction created within the chambers, said first named valve having a channel to afford communication with the opening and the atmosphere when the first named valve is seated, said chambers being one above the other, the communication of the return line with the second chamber being above the filtering unit, said chambers being positioned above the crank case so that when the first valve is open and the suction through the chambers broken oil in the second chamber will siphon back through the first named line to the crank case.

4. An oil purifying apparatus for use in connection with an internal combustion engine having an intake manifold and a crank case, said apparatus having upper and lower chambers, a filtering unit separating said chambers, a pipe line discharging in one of the chambers and adapted to have communication with the crank case, a line in communication with the second chamber and adapted for connection with the intake manifold so that pulsations of the motor will create a suction through the chambers and through the first named line to draw oil from the crank case into the first named chamber and through the filtering unit into the second chamber, said second chamber having an opening in communication with the atmosphere, a valve normally closing said opening, a float operatively connected with the valve for unseating the valve when the oil within the second chamber reaches a predetermined level, a return line leading from the second chamber to the crank case, a check valve within said last named line, said check valve being maintained in closed position by the suction created within the chambers, said filtering unit comprising a screen element, a fibrous mass arranged on said screen element, and means for holding said fibrous mass on the screen element.

5. An oil purifying apparatus for use in connection with an internal combustion engine having an intake manifold and a crank case, said apparatus having upper and lower chambers, a filtering unit separating said chambers, a pipe line discharging in one of the chambers and adapted to have communication with the crank case, a line in communication with the second chamber and adapted for connection with the intake manifold so that pulsations of the motor will create a suction through the chambers and through the first named line to draw oil from the crank case into the first named chamber and through the filtering unit into the second chamber, said second chamber having an opening in communication with the atmosphere, a valve normally closing said opening, a float operatively connected with the valve for unseating the valve when the oil within the second chamber reaches a predetermined level, a return line leading from the second chamber to the crank case, a check valve within said last named line, said check valve being maintained in closed position by the suction created within the chambers, said filtering unit comprising a screen element, a fibrous mass arranged on said screen element, and a concavo convex plate coacting with the screen element for holding the fibrous mass on the screen element, said plate being provided with openings.

6. An oil purifying apparatus for use in connection with an internal combustion engine having an intake manifold and a crank case, said apparatus having upper and lower chambers, a filtering unit separating said chambers, a pipe line discharging in one of the chambers and adapted to have communication with the crank case, a line in communication with the second chamber and adapted for connection with the intake manifold so that pulsations of the motor will create a suction through the chambers and through the first named line to draw oil from the crank case into the first named chamber and through the filtering unit into the second chamber, said second chamber having an opening in communication with the atmosphere, a valve normally closing said opening, means for unseating the valve when the oil level within the second chamber reaches a predetermined level, a return line leading from the second chamber to the crank case, and a check valve within said last named line, said check valve being maintained in closed position by the suction created within the chambers.

SAMUEL H. FRYE.
FRANK H. FORD.